Dec. 13, 1955 E. V. QUISTGAARD ET AL 2,726,748
CENTRIFUGALLY OPERATED DRAG RELEASE FOR HYDRAULIC CLUTCH
Filed Jan. 25, 1950 2 Sheets-Sheet 1

INVENTORS.
Erik V. Quistgaard,
William T. Dunn.
BY
Harness and Harris
ATTORNEYS.

Dec. 13, 1955     E. V. QUISTGAARD ET AL     2,726,748
CENTRIFUGALLY OPERATED DRAG RELEASE FOR HYDRAULIC CLUTCH
Filed Jan. 25, 1950     2 Sheets-Sheet 2

INVENTORS.
Erik V. Quistgaard,
William T. Dunn.
BY
Harness and Harris
ATTORNEYS.

United States Patent Office 2,726,748
Patented Dec. 13, 1955

2,726,748

CENTRIFUGALLY OPERATED DRAG RELEASE FOR HYDRAULIC CLUTCH

Erik V. Quistgaard and William T. Dunn, Detroit, Mich., assignors to Chrysler Corporation, Highland Park, Mich., a corporation of Delaware Application January 25, 1950, Serial No. 140,456

12 Claims. (Cl. 192—85)

This invention relates to pressure fluid operated clutch and/or brake mechanisms and particularly to mechanisms of this type wherein the pressure fluid cylinder bore for the actuating means associated with such mechanisms is rotatable during both engagement and disengagement of the mechanism.

It is a primary object of this invention to provide a mechanism of this type having centrifugal pressure head compensating means that effectively prevents unintended actuation of the mechanism by centrifugal forces resulting from rotation of certain fluid filled parts of the mechanism.

It is an additional object of this invention to provide a mechanism of this type having centrifugal pressure head compensating means that overbalances the centrifugal pressure head of the rotated actuating fluid so as to cause the load transmitting capacity of the mechanism to vary with its rotative speed and to be substantially equal to the value of the load being transmitted by the mechanism at any given speed.

It is a further object of this invention to provide a mechanism of this type having centrifugal pressure head compensating means that combines with certain spring type clutch actuating means in such a manner as to permit the use of spring actuating means of a smaller and cheaper type.

It is a still further object of this invention to provide a hydraulically operated clutch mechanism having positive means to prevent engagement of the clutch except at the times when the clutch actuating fluid is being purposely directed into the actuating cylinder of the clutch to effect clutch engagement.

Other objects and advantages of this invention will become readily apparent from a reading of the following description thereof and a consideration of the related drawings wherein.

The invention disclosed herein is primarily directed to hydraulically operated clutches and particularly to a clutch such as the clutch D that is utilized to lock up one of the planetary gear trains in the transmission unit B hereinafter described. It will be obvious from the description appearing hereinafter that this invention is readily applicable to any hydraulically operated clutch or brake regardless of its use.

Figure 1:
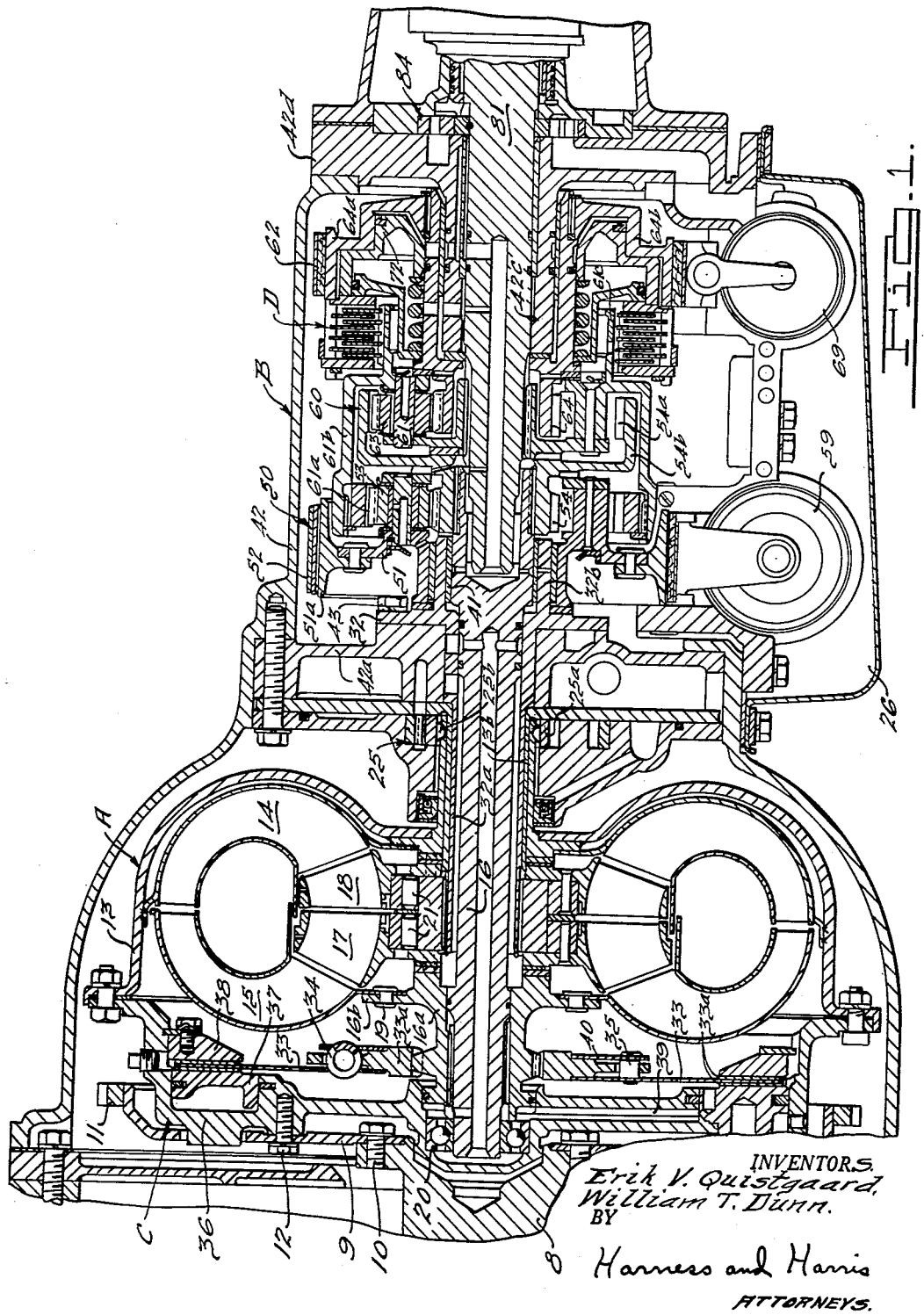
Fig. 1 is a sectional elevation of a torque converter driven planetary gear type power transmission unit having a clutch mechanism therein embodying this invention.

Fig. 1 of the drawings discloses a power transmission unit comprising a hydrokinetic torque converter unit A arranged in series with and operatively connected to a planetary gear box B. Converter unit A is adapted to drivingly connect a prime mover such as a motor vehicle engine to the input to the planetary gear type torque transmitting and torque multiplying unit B. The reference numeral 8 represents an end portion of a driving member, such as the engine crankshaft of a motor vehicle power unit. The shaft 8 is drivingly connected to the rotatable, axially flexible, drive transmitting plate 9 by the screw means 10. The drive transmitting plate 9 has an engine starter ring gear 11 fixedly mounted about its periphery. Also drivingly connected to the drive plate 9 by the bolt means 12 is the torque converter casing 13 within which are mounted the various converter components, namely, the impeller member 14, the turbine or runner member 15, and the guide wheels or reaction members 17 and 18.

The vaned impeller wheel 14 is fixedly connected to the converter casing 13 by welds or the like and is accordingly adapted to be rotatably driven by the driving shaft 8. The vaned turbine wheel 15 is drivingly connected by rivet means 19 to a radially extending flange portion 16b formed on the shaft hub member 16a that is drivingly connected to the forward end portion of the intermediate driven shaft member 16.

The intermediate shaft member 16 is adapted to transmit drive from the turbine member 15 of the torque converter unit A to the planetary gear unit B which gear unit is arranged in series with the torque converter unit A. The forward end of intermediate shaft 16 is journaled in the bearing 20 that is associated with the torque converter lock-up clutch C. The rear end portion of intermediate shaft 16 is rotatably supported by a sleeve-type of bearing 41 that is mounted in the fixed sleeve unit 32 carried by the housing 42 of the transmission unit B.

The vaned guide wheels 17 and 18 are rotatably supported within the converter casing 13 by the guide wheel hub portions that are rotatably mounted, by means of one-way brake devices 21, on the axially extending sleeve portion 32a of the sleeve unit 32. Sleeve unit 32 is fixed to and projects from the wall 42a of the relatively stationary, gear box housing 42. The one-way brakes 21 are arranged such that they will permit only forward rotary movement (clockwise when looking from the converter A towards the gear unit B) to be transmitted to the guide wheels 17 and 18 by the forward rotation of the impeller 14. The brakes 21 preventing rotation of the guide wheels 17 and 18 in a reverse or counterclockwise direction.

The torque converter unit A includes a gear type oil pump 25 having a driving gear 25a that is directly connected by key means 25b to the axially extending flange portion 13b of the rotatable converter casing 13. The pump 25 draws oil from a sump 26 and circulates it through the converter unit A, the transmission lubricating system and the various hydraulically operated control mechanisms associated with this transmission unit. A second pump 84, driven by the transmission output shaft 81 is also included in this transmission to provide a source of pressure fluid for the various hydraulically operated devices associated with the transmission unit when the engine is not operating.

In order to provide means for transmitting a positive, two-way direct drive from the driving shaft 8 to the intermediate shaft 16 a torque converter lock-up clutch C is provided. The lock-up clutch C includes the radially extending drive transmitting disc 33 which has friction elements 33a mounted on its side faces adjacent its periphery. Drive transmitting disc 33 is drivingly connected by hub portion 33a to the shaft 16 through the shaft hub member 16a. Mounted between the disc 33 and the disc hub member 33a are several circumferentially spaced compression spring elements 34 (only one shown) that cushion the torque impact transmitted to the disc 33 on engagement of the clutch C. Springs 34 thereby facilitate smooth engagement of the clutch C. Pins 35 are arranged to extend between the disc 33 and an anchor plate 40 through enlarged openings in the hub member 33a so as to provide an additional means to connect the disc 33 and hub member 33a in the event of failure of the springs 34. Pins 35 also urge the disc 33 and anchor plate 40 against the sides of the hub member 33a and thereby tend to damp out vibrations of the disc 33. Cooperatively associated with the drive transmitting disc 33 is a hydraulic cylinder plate 36 that is assembled as a part of the torque converter casing 13. Mounted within the piston bore in cylinder 36 is an axially shiftable, hydraulically actuated, piston 37. Cylinder 36 also supports a backing plate 38 which is arranged to cooperate with the piston 37 so as to provide means to clampingly engage the friction faces 33a of clutch disc 33 when pressure fluid is admitted to the cylinder 36. Pressure fluid may be introduced to the cylinder 36 through the bore 39 in the clutch cylinder plate 36. Admission of pressure fluid to the piston bore in cylinder 36 will move the piston 37 rearwardly so as to engage the torque converter lock-up clutch C and directly connect the driving shaft 8 to the intermediate shaft 16. On release of the pressure fluid from the piston bore in cylinder 36 suitable spring means (not shown) will urge the piston 37 forwardly to disengage the clutch C and provide a means for the transmission of a torque multiplying drive from shaft 8 through the fluid operated torque converter A and the associated intermediate shaft 16.

The gear box B includes the planetary gear trains 50, 60, which provide means for the transmission of torque multiplying reverse and forward drives respectively. The gear box housing 42 includes the forward wall portion 42a to which is connected by bolt means 43 a radially extending flange 32b of the axially extending hollow sleeve member 32. The axially extending rear portion 32b of sleeve 32 provides a journal support for the planet pinion carrier member 51 of the reverse drive planetary gear train 50.

Figure 3:
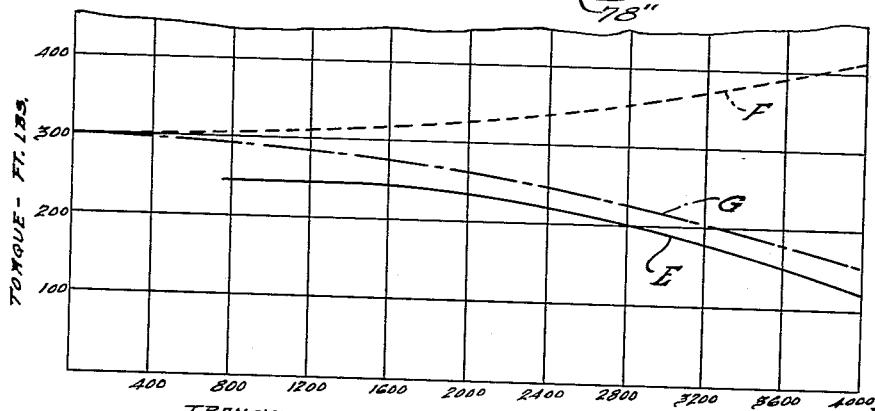
Fig. 3 is a graph disclosing the effect on clutch capacity resulting from application of this invention to the power transmission unit herein disclosed, the clutch capacity being shown plotted against the torque transmitted by the driving engine unit at various speeds.

Reverse planetary gear train 50 includes the planet pinion carrier 51 which is formed with an axially extending peripheral drum portion 51a adapted to be engaged by the braking band 52. Band 52 is actuated by servo unit 59. Rotatably mounted on carrier 51 are a plurality of planet pinions 53, only one of which is shown in Fig. 3. The teeth of planet pinions 53 drivingly mesh with the external teeth of the sun gear member 54. Sun gear member 54 is drivingly connected to the rear end portion of the torque converter turbine driven shaft 16. The teeth of planet pinions 53 are also in meshing engagement with the internal teeth 61a formed on the drum-like extension 61b of the planet carrier 61 of the forward planetary gear train 60. The drum member 61b, while forming the annulus gear of the reverse drive planetary gear train 50, is supported by and also forms a part of the planet carrier 61 of the forward drive planetary gear train 60.

Forward drive planetary gear train 60 includes the planet pinion carrier 61 which is splined to and supported by the output shaft 81. Planet pinions 63, which are rotatably mounted on planet carrier 61, have teeth meshingly engaged with internal teeth 54a on the rearwardly projecting drum-like flange portion 54b of sun gear 54 of the reverse drive planetary gear train 50. This internally toothed portion 54b of the reverse drive planetary sun gear 54 thus forms the annulus gear of the forward drive planetary gear train 60. The teeth of pinions 63 also meshingly engage external teeth on the sun gear 64 which is journaled on the axially extending sleeve 42c carried by the gear box housing wall 42d. Sun gear 64 mounts a brake drum portion 64a. Braking band 62 is adapted to be applied to the peripheral portion of brake drum 64a to anchor the sun gear of the forward drive planetary gear train 60 against rotation. Band 62 is actuated by the servo unit 69.

It will be noted that the input to either of the planetary gear trains 50 or 60 is always through the driven sun gear member 54 which gear member is drivingly connected to the torque converter turbine driven shaft 16. The output from either of the planetary gear trains 50 or 60 is always through the planet pinion carrier 61 which is splined to the output shaft 81. Drive from sun gear 54 through the several planetary gear trains to the output shaft 81 is controlled by the application of the several braking bands 52, 62 of the planetary gear trains 50, 60 and the condition of the torque converter lock-up clutch C.

If the planetary gear box B has more or less conventional gear train ratios of 1.5 to 1 for the forward gear train 60 and 2.0 to 1 for the reverse gear train 50 then it will be found that in neutral the sun gear member 64 and the clutch mechanism D carried thereby will rotate at approximately twice the speed of the transmission input shaft 16. In reverse due to the relative motion between the sun gear 64 and the carrier 61, the speed of the carrier 61 relative to the sun gear 64 is about three times the speed of the transmission input shaft 16. These relative speeds are of importance for they point out the possible relative speeds between the clutch discs 65 and 66 when clutch D is not completely engaged. The following description will bring out the possible disadvantages of such an arrangement if the clutch mechanism D is not provided with a positive means for preventing unintended or partial engagement of the clutch mechanism D.

Figure 2:
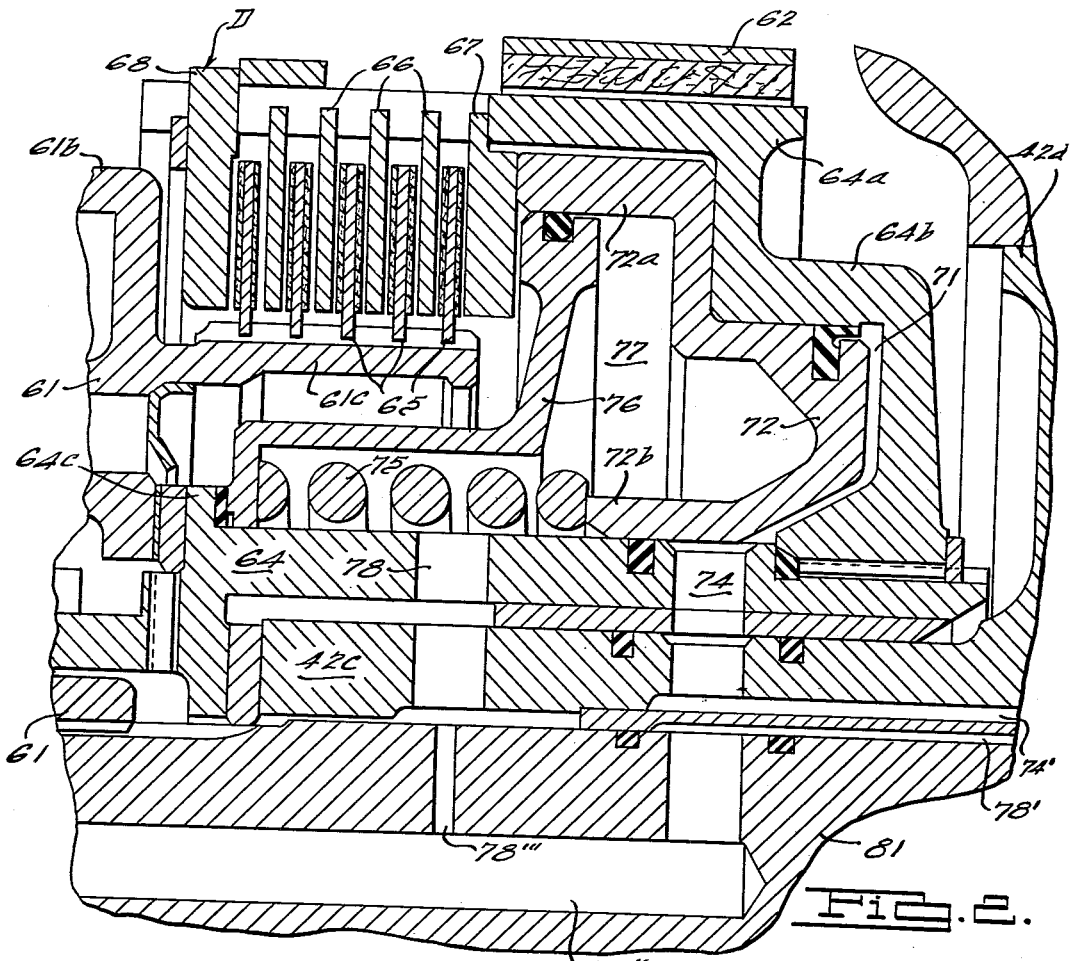
Fig. 2 is an enlarged fragmentary, sectional elevation of portions of the clutch mechanism embodying this invention.

In addition to providing a means for the transmission of a forward fluid and mechanically transmitted torque multiplying drive through the series arranged torque converter A and the planetary gear train 60, this transmission unit includes means whereby the planetary gear train 60 may be by-passed and a forward, fluid transmitted, torque multiplying drive transmitted directly from the torque converter A to the output shaft 81. The means for accomplishing this fluid transmitted torque multiplying drive includes the clutch mechanism D (see Figs. 1 and 2). This clutch D is arranged to directly connect the converter turbine driven shaft 16 to the output shaft 81.

Clutch mechanism D includes the rotatable gear member 64 having the pressure cylinder bore 71 therein that is formed by the dish-like shape of sun gear member 64 with its drum-like extensions 64b and 64a respectively. Reciprocably mounted in the cylinder bore 71 is the clutch actuating piston 72. Piston 72 is adapted to be moved forwardly by the admission of pressure fluid to the cylinder bore 71 through the pressure fluid inlet bores 74', 74. Piston member 72 has a finger portion 72a that is adapted to be moved into engagement with the axially movable clutch pressure plate 67 so as to clampingly engage the clutch discs 65, 66 between the pressure plate 67 and the backing plate 68. Friction surfaced clutch discs 65 are drivingly mounted on the axially extending flange 61c that projects from the pinion carrier 61. Clutch discs 66 are drivingly connected to the axially extending flange 64a that forms a part of the sun gear 64. When discs 65 and 66 are drivingly engaged the planetary gear train 60 is locked up and a direct drive is transmitted from the gear 54a and shaft 16 to the output shaft 81. Plates 67 and 68 are both drivingly connected to the flange portion 64a of the sun gear member 64. A compression spring member 75 extends between the inner radially extending portion of partition 76, that abuts against the radially extending shoulder 64c of gear member 64, and the finger portion 72b of the piston member 72. Spring 75 normally urges the piston 72 to its rearwardly positioned, clutch disengaged, position. Mounted within the clutch mechanism D is the annular partition member 76 that extends between the piston finger 72a and the sun gear flange 64c. The connections between the partition 76 and the gear flange 64c and piston finger 72a are provided with suitable sealing means such that a fluid tight chamber 77 is formed on the side of the piston 72 opposite the cylinder bore 71. Pressurized fluid is admitted to the chamber 77 through the inlet bores 78', 78'', 78''', 78. It will be noted that the piston 72 is shaped so as to provide a stepped construction wherein the effective pressure area on the side of the piston adjacent the chamber 77 is considerably greater than the effective pressure area on the side of the piston adjacent the bore 71.

In operation of the clutch mechanism D pressurized fluid from the rear, output shaft driven pump 84 is directed into the cylinder bore 71 through the inlet bore 74, 74' to cause engagement of the clutch discs 65 and 66. This clutch applying fluid preferably exerts a pressure of approximately 40–80 pounds per square inch. In the chamber 77 on the opposite side of the cylinder bore 71 and the piston 72 there is contained pressurized fluid of a lower pressure than that in the bore 71. This low pressure fluid may be lubricating oil of approximately 5–15 pounds per square inch pressure or some similar pressure relationship that varies directly with speed of the shafts 8 or 16. The purpose and function of the opposed, fluid filled, pressure chambers 71, 77 on opposite sides of the piston 72 will become apparent from the subsequent description.

One of the difficulties that has been encountered in the use of rotatable, hydraulically actuated clutches and/or brakes is the automatic and unintended engagement of the clutch and/or brake due to the centrifugal pressure head developed within the clutch or brake mechanism as a result of rotation of the fluid filled mechanism. Even when high pressure fluid is not being purposely directed into the actuating cylinder bore 71 it is conventional practice to have a certain amount of low pressure fluid in the bore 71 so that action of the clutch D will be rapid when high pressure fluid is admitted to the bore 74 and chamber 71. Even if bore 71 is connected to a sump when clutch D is disengaged, still, it is seldom that the chamber 74 would be completely drained of all fluid during clutch disengagement. As the gear member 64 is rotatable when the clutch D is in either engaged or disengaged condition it is thought to be obvious that the member 64 will function as a suction pump and centrifugal action will suck fluid into bore 71 and cause the fluid within the bore 71 to move radially outward so as to develop a pressure head in the bore 71 that will tend to engage the clutch discs 65 and 66. While the pressure head may or may not be sufficient to completely engage the clutch D still it can cause a light contact between clutch discs 65 and 66 as they slide or rotate relative to one another. This sliding contact between the rotating discs 65 and 66 at a time when the clutch D is not intended to be engaged causes unnecessary wear of the clutch discs 65 and 66 and frequently burns out the clutch so that it is completely useless. In addition to destroying the clutch this drag between the clutch discs 65 and 66 increases the friction losses in the transmission unit and renders the unit less efficient. At times the centrifugal pressure head may become sufficiently great to actually cause engagement of the clutch D at a time when the transmission unit is manually conditioned for neutral or no-drive and unintended drive will be transmitted through the transmission unit. This so-called creep of the output shaft can be extremely dangerous under certain circumstances.

In addition to being objectionable during disengagement of the clutch D, the centrifugal pressure head in chamber 71 also tends to increase the pressure head used to apply the clutch D over that necessary for satisfactory operation of the clutch D and this tends to interfere with the smooth operation of clutch D.

With the arrangement herein disclosed the pressure fluid chamber 77 provides a compensating chamber that prevents unintended application and wear of the clutch D. This arrangement also provides a means whereby the clutch capacity is automatically varied so that it conforms to the torque curve of the driving unit (see Fig. 3). In addition, assembly of the clutch mechanism is simplified and cheapened for the clutch disengaging spring 75 may be of a much smaller size and strength than that used in a more or less conventional clutch construction.

It is thought to be obvious that the fluid in the compensating chamber 77 will develop a centrifugal head on clutch rotation that will combine with the applied pressure of the lubricating oil and the force exerted by the disengagement spring 75 to prevent unintended engagement of the clutch D. It is quite clear from Fig. 2 that the size of the chamber 77 is considerably greater than the size of the cylinder bore 71. Accordingly, the force exerted by the pressure of the fluid in chamber 77 is more than sufficient to overcome the pressure head of the fluid that exists in or is sucked into the cylinder bore 71 by rotation of gear 64 and the associated clutch parts.

An even more important advantage of the compensating chamber 77 is the pressure head overbalancing effect it exerts so as to cause the clutch capacity curve F (see Fig. 3) to conform to the torque curve E of the driving member. Fig. 3 is a graphic representation of this phenomena. Curve E represents the torque curve of the clutch driving member, in this instance the engine that drives the converter A and transmission gear unit B. It will be noted that the torque transmitted by the engine decreases as the speed increases. Curve F is the clutch capacity curve of a conventional hydraulically operated clutch mechanism that does not include a centrifugal pressure head compensating means such as the chamber 77 of the construction disclosed. Due to the fact that the centrifugal pressure head in the conventional clutch cylinder bore 71 progressively increases with increase in speed of the rotating driving member and clutch mechanism, it is thought to be obvious that the clutch capacity will increase with the speed of the driving member. Therefore the difference between the engine torque and the clutch capacity necessary to transmit the engine torque at any given speed becomes progressively greater as the engine speed increases and this tends to produce jerkiness or unsmooth clutch engagement at the higher engine speeds. The divergence of curves E and F is thought to clearly bring out this fact. In contrast, it will be noted that the clutch capacity curve G for a clutch mechanism D having a centrifugal pressure head compensating means such as the chamber 77 herein disclosed, closely conforms to the torque curve of the driving member. As a result of the close conformance of the curves E and G the unnecessary clutch capacity is reduced to a minimum and very smooth clutch engagement is obtained. This is particularly advantageous when so-called overlap shifts are made. The reason the compensating chamber 77 provides this overbalancing effect is that it is designed to be larger in size than the bore 71 and thus the effective area transmitting the centrifugal pressure head of the fluid in the chamber 77 is greater than the effective piston head area exposed in the bore 71 that transmits the centrifugal pressure head of the clutch applying fluid in the bore 71. Not only is the effective area of the compensating chamber 77 greater than that of the piston bore 71 but it will be noted that the chamber 77 extends radially outward from shaft 81 a greater distance than the bore 71. As the centrifugal pressure head varies as the square of the radial distance it is obvious that the force exerted by the fluid in the compensating chamber 77 is considerably greater than that exerted by the fluid in the bore 71.

In a clutch mechanism that utilizes lubricating oil to fill the compensating chamber 77, it will be found that even when the driving engine is not running that a certain amount of lubricating oil will be trapped in the chamber 77 so that on starting of the engine this oil is immediately centrifuged to the outer peripheral portions of the chamber 77 to prevent unintended engagement of the clutch D.

By adding fluid pressure in chamber 77 to the force of the clutch disengaging spring 75, it is obvious that the size and strength of the disengaging spring 75 may be reduced over that used in a conventional spring assembly. This reduction in size and strength of the spring 75 not only reduces the cost of clutch materials but it materially simplifies the assembly of the clutch unit for a low strength spring of about 100 pounds strength can be used in place of a spring of 800 pounds strength. Assembly of units which include high strength compression springs is considerably more difficult and expensive than assembly of units having low strength, easily compressible springs.

It is thought to be readily apparent that the construction herein disclosed provides a clutch mechanism that gives vastly improved operation at a reduced cost. As the fluid directed into the compensating chamber is already available and as the space of the chamber is normally wasted, the few additional parts required to convert a conventional clutch mechanism into a compensated mechanism of this type are more than paid for by the reduction in assembly costs and the many other advantages obtained.

The transmission unit herein disclosed is more fully explained in the application of Paul C. Ackerman et al., Serial Number 150,490 filed March 18, 1950, now U. S. Patent 2,667,085 dated January 26, 1954.

We claim:

1. A pressure fluid operated clutch mechanism comprising rotatable driving and driven members arranged for relative axial movement and adapted to be engaged for the transmission of drive, a closed end stepped and axially extending, cylinder bore on one of said members, a stepped piston movably mounted in said bore and arranged to be reciprocably actuated therein by the admission of pressure fluid to opposite ends of said bore, the actuation of said piston by the admission of a relatively high pressure fluid to the smaller diameter end of said bore being adapted to effect engagement of said members, and resilient means and a relatively low pressure fluid operated means mounted in the larger diameter end of said bore and rotatable with said one of said members having portions thereof engageable with said piston and arranged to oppose actuation of said piston by the pressure fluid in said smaller diameter end of said bore so as to prevent unintended engagement of said members by centrifugally developed forces transmitted to the piston by the pressure fluid in said smaller diameter end of said bore, the relatively low pressure fluid in the larger diameter end of said bore being effective to disengage said clutch mechanism and to cause the torque capacity of said clutch to conform to the torque load transmitted by the clutch mechanism.

2. A pressure fluid operated clutch mechanism adapted to be drivingly connected between rotatable driving and driven members comprising a first clutching element carried by and movably mounted on one of said members, a second clutching element mounted on the other of said members, a closed end pressure fluid cylinder bore carried by said one of said members, a double acting pressure fluid actuatable member reciprocably mounted in said bore and arranged so as to transmit movement thereof to said first clutching element to effect engagement and disengagement of the clutching elements, means to direct a first pressurized fluid into the bore on one side of said pressure fluid actuatable member, and means to direct a second pressurized fluid into said bore on the opposite side of said pressure fluid actuatable member, said bore being of stepped construction and arranged to extend in an axial direction relative to the axis of rotation of said one of said members, said pressure fluid actuatable member being of a stepped construction wherein the effective pressure area portion on one side thereof is less than the effective pressure area portion on the other side thereof, certain portions of the effective pressure are on said other side of the pressure fluid actuable member being located radially outwardly from the outer periphery of the effective pressure area portion on said one side of the pressure fluid actuable member to provide means to overbalance the centrifugal force effect of the first pressurized fluid supplied to the bore on said one side of the pressure fluid actuable member.

3. A pressure fluid operated clutch mechanism adapted to be drivingly connected between rotatable driving and driven members comprising a first clutching element carried by and movably mounted on one of said members, a second clutching element mounted on the other of said members, a closed end pressure fluid cylinder bore carried by said one of said members, a double acting pressure fluid actuatable piston member reciprocably mounted in said bore and arranged so as to transmit movement thereof to said first clutching element to effect engagement and disengagement of the clutching elements, means to direct a first pressurized fluid into the bore on one side of said pressure fluid actuatable piston member, and means to direct a second pressurized fluid into said bore on the opposite side of said pressure fluid actuatable piston member, said bore being of stepped construction and arranged to extend in an axial direction relative to the axis of rotation of said one of said members, and resilient means engageable with said opposite side of said pressure fluid actuable piston member arranged to resist movement of said first clutching element into engagement with said second clutching element, said piston member being of a stepped construction and having the effective area on said opposite side of the piston member that is acted on by said second pressurized fluid greater than the effective area on said one side of the piston that is acted on by said first pressurized fluid.

4. A pressure fluid operated clutch mechanism adapted to be drivingly connected between rotatable driving and driven members comprising a first clutching element carried by and movably mounted on one of said members, a second clutching element mounted on the other of said members, a closed end pressure fluid cylinder bore carried by said one of said members, a double acting pressure fluid actuatable piston member reciprocably mounted in said bore and having portions arranged so as to transmit movement thereof to said first clutching element to effect engagement of the clutching elements, means to direct a first pressurized fluid into the bore on one side of said pressure fluid actuatable piston member, and means to direct a second pressurized fluid into said bore on the opposite side of said pressure fluid actuatable piston member, said bore being of stepped construction and arranged to extend in an axial direction relative to the axis of rotation of said one of said members, said pressure fluid actuatable piston member being of a stepped construction wherein the effective pressure area portion on said one side thereof is less than the effective pressure area portion on said opposite side thereof, portions of the effective pressure area on the said opposite side of said pressure fluid actuable piston member being arranged at a greater radius of rotation than the maximum radius of rotation of portions on said one side of the pressure fluid actuable member.

5. A pressure fluid operated clutch mechanism adapted to be drivingly connected between rotatable driving and driven members comprising a first clutching element carried by and movably mounted on one of said members, a second clutching element mounted on the other of said members, a closed end pressure fluid cylinder bore carried by said one of said members, a double acting pressure fluid actuatable member reciprocably mounted in said bore and having portions arranged so as to transmit movement thereof to said first clutching element to effect engagement of the clutching elements, means to direct a relatively high pressure fluid into the bore on one side of said pressure fluid actuatable member, and means to direct a relatively low pressure fluid into said bore on the opposite side of said pressure fluid actuatable member, said bore being of stepped construction and arranged to extend in an axial direction relative to the axis of rotation of said one of said members, said pressure fluid actuatable member being of a stepped construction wherein the effective pressure area portion on said one side thereof is less than the effective pressure area portion on said opposite side thereof, portions of the effective pressure area on the said opposite side of said pressure fluid actuable member being arranged at a greater radius of rotation than the maximum radius of rotation of portions on said one side of the pressure fluid actuable member and resilient means mounted on and engageable with said opposite side of said pressure fluid actuable member, said relatively low pressure fluid and said resilient means being arranged to cooperatively resist movement of said first clutching element into engagement with said second clutching element, said low pressure fluid in the bore on the opposite side of said pressure fluid actuatable member being further adapted to cause the torque transmitting capacity of the clutch mechanism to vary inversely with the speed of the clutching elements.

6. A clutch mechanism adapted to drivingly connect rotatable driving and driven shafts comprising a first clutch element drivingly carried by and axially movable with respect to said driving shaft, a second clutch element drivingly mounted on said driven shaft and adapted to be engaged with said first clutch element, an axially extending, stepped pressure fluid cylinder bore carried by said driving shaft, a stepped piston member including a larger and a smaller diameter portion reciprocably mounted in said bore and arranged such that actuation thereof is transmitted to said first clutch element to effect engagement of said clutch elements, a relatively high pressure fluid supply to the portion of said bore receiving the smaller diameter portion said piston to provide for the actuation of said piston, a relatively low pressure fluid supply to the portion of the bore receiving the larger diameter portion of the piston, and resilient means mounted in said larger diameter portion of the bore arranged to oppose actuation of said piston by the admission of relatively high pressure fluid to the smaller diameter portion of the bore, said relatively low pressure fluid being variable in substantially direct proportion to shaft speed whereby the torque transmitting capacity of the clutch mechanism varies in proportion to the torque load transmitted thereby.

7. A clutch mechanism adapted to drivingly connect rotatable driving and driven shafts comprising a first clutch element drivingly carried by and axially movable with respect to said driving shaft, a second clutch element drivingly mounted on said driven shaft and adapted to be engaged with said first clutch element, an axially extending, stepped, pressure fluid cylinder bore carried by said driving shaft, a stepped piston member reciprocably mounted in said bore and arranged such that actuation thereof is transmitted to said first clutch element to effect engagement of said clutch elements, a relatively high pressure fluid supply to the portion of said bore on one side of the head of said piston to provide for the actuation of said piston to clutch engaged position, a closed chamber on the opposite side of the head of said piston, a relatively low pressure fluid supply to said chamber, said piston being of a stepped construction whereby the effective pressure area on the chamber side of the head of the piston is greater than the effective pressure area on the bore side of the head of the piston whereby said relatively low pressure fluid tends to disengage said clutch and causes the clutch capacity to vary in direct relation to the torque transmitted.

8. A clutch mechanism adapted to drivingly connect rotatable driving and driven shafts comprising a first clutch element drivingly carried by and axially movable with respect to said driving shaft, a second clutch element drivingly mounted on said driven shaft and adapted to be engaged with said first clutch element, an axially extending, stepped pressure fluid cylinder bore carried by said driving shaft, a stepped piston member reciprocably mounted in said bore and arranged such that actuation thereof is transmitted to said first clutch element to effect engagement of said clutch elements, a relatively high pressure fluid supply to the portion of said bore on one side of the head of said piston to provide for the actuation of said piston to clutch engaged position, a closed chamber on the opposite side of the head of said piston, a relatively low pressure fluid supply to said chamber, said piston being so arranged that portions of the effective pressure area on the chamber side of the head of the piston are located at a greater rotational radius than any portions of the effective pressure area on the bore side of the head of the piston whereby said relatively low pressure fluid tends to disengage said clutch and causes the clutch capacity to vary in direct relation to the torque transmitted.

9. A clutch mechanism adapted to drivingly connect rotatable driving and driven shafts comprising a first clutch element drivingly carried by and axially movable with respect to said driving shaft, a second clutch element drivingly mounted on said driven shaft and adapted to be engaged with said first clutch element, an axially extending, stepped pressure fluid cylinder bore carried by said driving shaft, a stepped piston member reciprocably mounted in said bore and arranged such that actuation thereof is transmitted to said first clutch element to effect engagement of said clutch elements, a relatively high pressure fluid supply to the portion of said bore on one side of the head of said piston to provide for the actuation of said piston to clutch engaged position, a closed chamber on the opposite side of the head of said piston, a relatively low pressure fluid supply to said chamber, said piston being of a stepped construction whereby the effective pressure area on the chamber side of the head of the piston is greater than the effective pressure area on the bore side of the head of the piston, said piston being so arranged that portions of the effective pressure area on the chamber side of the head of the piston are located at a greater rotational radius than any portions of the effective pressure area on the bore side of the head of the piston whereby said relatively low pressure fluid tends to disengage said clutch and causes the clutch capacity to vary in direct relation to the torque transmitted.

10. A clutch mechanism adapted to drivingly connect rotatable driving and driven shafts comprising a first clutch element drivingly carried by and axially movable with respect to said driving shaft, a second clutch element drivingly mounted on said driven shaft and adapted to be engaged with said first clutch element, an axially extending, stepped pressure fluid cylinder bore carried by said driving shaft, a stepped piston member reciprocably mounted in said bore and arranged such that actuation thereof is transmitted to said first clutch element to effect engagement of said clutch elements, a relatively high pressure fluid supply to the portion of said bore on one side of the head of said piston to provide for the actuation of said piston to clutch engaged position, a closed chamber on the opposite side of the head of said piston, a relatively low pressure fluid supply to said chamber, and resilient means mounted in said chamber arranged to oppose actuation of said piston to clutch engaged position by the admission of pressure fluid to the bore on said one side of the piston head, said piston being of a stepped construction whereby the effective pressure area on the chamber side of the head of the piston is greater than the effective pressure area on the bore side of the head of the piston, said piston being so arranged that portions of the effective pressure area on the chamber side of the head of the piston are located at a greater rotational radius than any portions of the effective pressure area on the bore side of the head of the piston whereby the low pressure fluid in the chamber produces a force on the piston that overbalances the centrifugally generated force exerted on the piston by the high pressure fluid in said bore so that the torque transmitting capacity of the clutch mechanism is caused to vary directly as the torque load applied to the clutch mechanism.

11. A pressure fluid operated friction clutch mechanism comprising rotatable driving and driven members adapted to be engaged for the transmission of drive, a closed end, axially extending, cylinder bore on one of said members, a double acting piston reciprocably mounted in said bore and arranged to be actuated therein by the admission of pressure fluid to one end of said bore to act on one end of said piston, the actuation of said piston by the admission of a first pressure fluid to said one end of said bore being adapted to effect engagement of said members, and a closed chamber formed at the other end of said bore having portions thereof arranged in contact with the other end of said piston and positioned such that a second pressurized fluid in said chamber will oppose actuation of said piston by the first pressurized fluid in the said one end of said bore, the effective pressure area of the end of the piston in said chamber being greater than the effective pressure area of the end of the piston in said bore, and said chamber having the portions thereof that are in contact with the effective pressure area of the end of the piston mounted therein arranged at a greater radius of rotation than the maximum radius of rotation of the portions of the bore receiving the effective pressure area of the piston end mounted in said bore whereby the second pressure fluid in said chamber is effective to cause disengagement of said clutch mechanism and the torque capacity of said clutch will vary inversely with rotational speed of the said one member.

12. In a friction clutch device adapted to be mounted on a rotatable driving member including a pair of engageable members, a casing element mounted on said rotatable driving member having an axially extending bore therein, a double acting piston of stepped construction is drivingly carried by said rotatable driving member and having a first pressure fluid applying portion reciprocably mounted in said bore, a second pressure fluid applying portion of said piston being arranged exteriorly of said bore and forming part of the walls of a variable capacity closed chamber that is drivingly mounted on said rotatable member, said second pressure fluid applying portion being disposed in opposed relationship to said first pressure fluid applying portion and being greater in area than said first pressure fluid applying portion, a member mounted on said rotatable member and projecting into engagement with said second portion of said piston to define other walls of said closed chamber, pressure fluid supply means to said bore and to said chamber, and means adapted to transmit axial movement of said piston to the engageable members of said clutch device.

References Cited in the file of this patent

UNITED STATES PATENTS

| | | |
|---|---|---|
| 1,249,736 | Frink | Dec. 11, 1917 |
| 2,328,090 | Nutt et al. | Aug. 31, 1943 |
| 2,328,091 | Nutt et al. | Aug. 31, 1943 |
| 2,381,786 | Tyler | Aug. 7, 1945 |
| 2,398,806 | Schneider | Apr. 23, 1946 |
| 2,399,853 | Chilton | May 7, 1946 |
| 2,482,460 | Browne | Sept. 20, 1949 |
| 2,633,218 | Pielstick | Mar. 31, 1953 |

FOREIGN PATENTS

| | | |
|---|---|---|
| 564,638 | Great Britain | Oct. 6, 1944 |
| 967,275 | France | Oct. 30, 1950 |